(12) United States Patent
Yoshida et al.

(10) Patent No.: US 10,411,567 B2
(45) Date of Patent: Sep. 10, 2019

(54) MOTOR AND MANUFACTURING METHOD OF MOVEMENT RESTRICTING STRUCTURE

(71) Applicant: MABUCHI MOTOR CO., LTD., Chiba (JP)

(72) Inventors: Atsushi Yoshida, Chiba (JP); Hisashi Ogino, Chiba (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 136 days.

(21) Appl. No.: 14/286,753

(22) Filed: May 23, 2014

(65) Prior Publication Data

US 2014/0346922 A1   Nov. 27, 2014

(30) Foreign Application Priority Data

May 23, 2013   (JP) ................... 2013-109002

(51) Int. Cl.
*H02K 13/00* (2006.01)
*H02K 15/00* (2006.01)
(Continued)

(52) U.S. Cl.
CPC ............. *H02K 13/00* (2013.01); *H01R 39/40* (2013.01); *H02K 5/148* (2013.01); *H02K 15/00* (2013.01); *Y10T 29/49011* (2015.01)

(58) Field of Classification Search
CPC ........ H02K 13/00; H02K 15/00; H02K 5/148; H02K 5/14; H02K 5/145; H02K 5/146;
(Continued)

(56) References Cited

U.S. PATENT DOCUMENTS 4,246,508 A * 1/1981 Zimmer ................. H01R 39/58
310/242
5,397,952 A * 3/1995 Decker ................ H01R 39/415
310/239
(Continued)

FOREIGN PATENT DOCUMENTS

JP   09-285061       10/1997
JP   09285061 A  *  10/1997
(Continued)

OTHER PUBLICATIONS

JP 09285061 A machine translation, Jun. 11, 2017.*
Office Action issued in JP2013-109002 dated Jan. 25, 2017; 6 pages (including English translation).

*Primary Examiner* — Julio C. Gonzalez
*Assistant Examiner* — Leda Pham
(74) *Attorney, Agent, or Firm* — Schwabe Williamson & Wyatt, PC (57) ABSTRACT

A motor includes a brush configured to contact a commutator and a movement restricting structure configured to restrict a movement of the brush. The movement restricting structure has: a carbon holder for housing the brush while permitting a movement of the brush in the commutator radial direction; and a circumferentially restricting part for restricting a movement of the brush in the commutator circumferential direction. The circumferentially restricting part has a passing port formed by punching, through which the brush passes.

9 Claims, 11 Drawing Sheets

(51) Int. Cl.
*H01R 39/40* (2006.01)
*H02K 5/14* (2006.01)

(58) Field of Classification Search
CPC ...... H02K 11/026; H01R 39/38; H01R 39/39; H01R 39/40
USPC ............................ 310/239, 256; 29/596–598
See application file for complete search history.

(56) References Cited

U.S. PATENT DOCUMENTS

| | | | | |
|---|---|---|---|---|
| 5,648,695 | A * | 7/1997 | Yamaguchi | H01R 39/40 310/239 |
| 5,861,691 | A * | 1/1999 | Soh | F02N 11/00 310/51 |
| 6,909,218 | B2 * | 6/2005 | Ortt | H01R 39/385 310/239 |
| 7,545,072 | B2 * | 6/2009 | Cutsforth | H01R 39/40 310/239 |
| 2009/0078837 | A1 * | 3/2009 | Seuffert | H01R 39/385 248/110 |

FOREIGN PATENT DOCUMENTS

| | | |
|---|---|---|
| JP | 2002-369457 | 12/2002 |
| JP | 2003-199301 | 7/2003 |
| JP | 2012-060745 | 3/2012 |

* cited by examiner

MOTOR AND MANUFACTURING METHOD OF MOVEMENT RESTRICTING STRUCTURE

CROSS-REFERENCE TO RELATED APPLICATIONS

This application is based upon and claims the benefit of priority from the prior Japanese Patent Application No. 2013-109002, filed on May 23, 2013, the entire content of which is incorporated herein by reference.

BACKGROUND OF THE INVENTION

1. Field of the Invention

The present invention relates to a motor, and in particular, to a motor including a brush for power supply.

2. Description of the Related Art

DC motors (hereinafter, also simply referred to as "motors") are used in a wide variety of fields and applications ranging from electrical equipment for automobiles, etc., audiovisual equipment, and household electrical appliances to toys and models. A DC motor generally supplies an electric current to rotor winding from a DC power supply via a brush and a commutator that the brush slidably contacts.

The brush is housed and held in a brush holder in which a moving space is provided in a direction perpendicular to the rotating shaft of the commutator, so that the tip of the brush presses the commutator by the rear end portion thereof being biased with a biasing member. It is designed to provide a certain clearance between the brush and the holder, in view of the thermal expansion of each member and the dimensional accuracy of each component. Accordingly, when the commutator starts rotating, the brush may shake in a direction in which the commutator rotates by the frictional force with the commutator.

In order to suppress such looseness of the brush, a motor including a brush device has been devised, in which a pressing piece for pressing the brush toward a side wall of the internal walls of the brush holder, the side wall being on the side of the commutator rotating direction, is provided in the brush (see Japanese Patent Application Publication No. 2002-369457).

The aforementioned brush holder is made of a resin and a cut-out portion (notch) is formed. The pressing part is a member that is made by bending a metal material and has a spring property, and is fixed to the tip of a place of the brush holder, in the place the cut-out portion of the brush holder being formed. In the aforementioned brush device, it is aimed to suppress the looseness of the brush by pressing the brush onto one side wall of the brush holder with a metal material having a spring property. However, there is a limit in suppressing the looseness of the brush by the spring property of a metal material, and hence the looseness of the brush is caused due to the clearance between the brush and the brush holder.

In addition, a brush holder of another type is formed by bending a metal material. Even in such a type, however, there is a limit on the working accuracy of the bending, and a relatively large clearance is caused between the brush and the brush holder, thereby causing the looseness of the brush.

SUMMARY OF THE INVENTION

The present invention has been made in view of these situations, and a purpose of the invention is to provide a motor in which looseness of a brush is suppressed by a simple configuration.

In order to solve the aforementioned problem, a motor of an aspect of the present invention comprises: a brush configured to contact a commutator; and a movement restricting structure configured to restrict a movement of the brush. The movement restricting structure includes: a holder for housing the brush while permitting a movement of the brush in the commutator radial direction; and a circumferentially restricting part for restricting a movement of the brush in the commutator circumferential direction. The circumferentially restricting part has a passing port formed by punching, through which the brush passes.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

A motor of an aspect of the present invention comprises a brush configured to contact a commutator and a movement restricting structure configured to restrict a movement of the brush. The movement restricting structure includes: a holder for housing the brush while permitting a movement of the brush in the commutator radial direction; and a circumferentially restricting part for restricting a movement of the brush in the commutator circumferential direction. The circumferentially restricting part has a passing port formed by punching, through which the brush passes.

According to this aspect, the looseness of the brush can be suppressed, because the dimensional accuracy of the circumferentially restricting part is high because of the punching. Further, punching can be performed on a plurality of members at one time, in contrast to bending, which contributes to an improvement in productivity. Herein, the punching includes, for example, pressing such as punching out and piercing. The material of the circumferentially restricting part is not particularly limited, as far as desired accuracy can be achieved, and examples thereof include, for example, metal plates made of brass, copper, and the like. Examples of the material of the brush include carbon, precious metals, alloys thereof, and the like. An example of the shape of the brush includes a chamfered rectangular parallelepiped.

The passing port may have a shape in which the circumference of the passing port is closed. Thereby, the stiffness of the entire member surrounding the passing port becomes higher than that of the case where a slit is provided in part of the circumference of the passing port, which can suppress a deformation by external force. Further, a deformation occurring at the punching is small, and hence the passing port having high dimensional accuracy can be formed.

The holder may be a tubular member, and the circumferentially restricting part may be a member having a positioning part by which the holder is positioned.

The holder and the circumferentially restricting part may be formed by a single member. Thereby, the number of parts can be reduced, and it is not necessary to take into consideration positional accuracy by assembling.

The movement restricting structure may include a bent portion by which the holder and the circumferentially restricting part are connected together. The bent portion may be connected to the side wall of the holder.

The circumferentially restricting part may be a plate-shaped member in which the passing port is formed, and an insertion hole may be formed in the holder, into which the circumferentially restricting part is inserted such that the passing port is positioned in the internal space in which the brush moves. Thereby, a displacement of the circumferentially restricting part itself can be suppressed, and hence the looseness of the brush can be further suppressed.

Another aspect of the present invention is also a motor. This motor comprises a brush configured to contact a commutator and a movement restricting structure configured to restrict a movement of the brush. The movement restricting structure includes: a holder for housing the brush while permitting a movement of the brush in the commutator radial direction; and a circumferentially restricting part for restricting a movement of the brush in the commutator circumferential direction. The clearance between the circumferentially restricting part and the brush, extending in the commutator circumferential direction, is formed to be smaller than that between the holder and the brush, extending in the commutator circumferential direction.

According to this aspect, it is not necessary to make the clearance between the holder and the brush, extending in the commutator circumferential direction, to be smaller than that between the circumferentially restricting part and the brush, extending in the commutator circumferential direction, and hence the working accuracy of the holder does not need to be increased so much, thereby allowing the yield of parts to be improved.

Still another aspect of the present invention is a manufacturing method of a movement restricting structure. This method is a manufacturing method of a movement restricting structure including: a holder for housing a brush, which is configured to contact a commutator of a motor, while permitting a movement of the brush in the commutator radial direction; and a circumferentially restricting part for restricting a movement of the brush in the commutator circumferential direction. This method comprises: forming the holder by bending a metal plate; and forming a passing port in the circumferentially restricting part by punching, through which the brush passes.

According to this aspect, the dimensional accuracy of the circumferentially restricting part can be increased because of the punching, and hence the movement restricting structure can be manufactured, in which the looseness of the brush is further suppressed.

Hereinafter, embodiments of the present invention will be described with reference to the accompanying drawings. In the description of the drawings, like elements will be denoted with like reference numerals and duplicative description will be appropriately omitted. In addition, the configurations described below are intended only to exemplify the invention, but not to limit the scope of the invention at all.

(First Embodiment)

Figure 1:
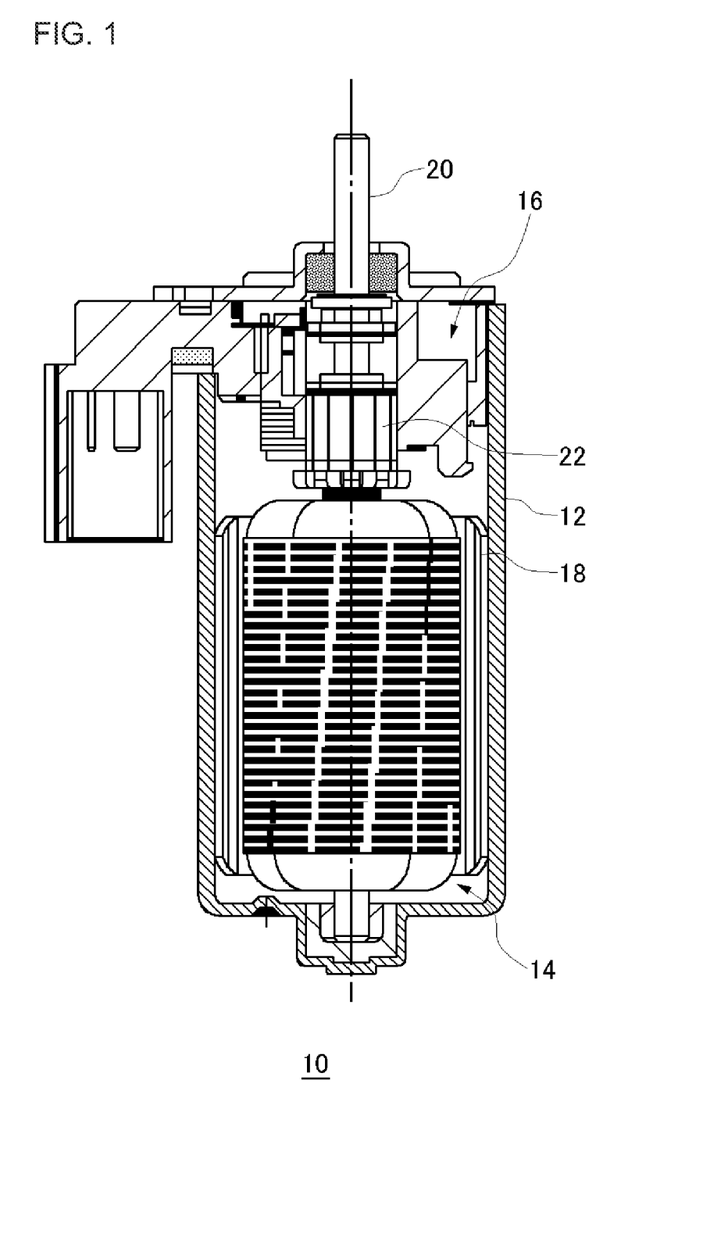
FIG. 1 is a sectional view of a DC motor according to First Embodiment.

FIG. 1 is a sectional view of a DC motor according to First Embodiment. A DC motor (simply referred to as a "motor") 10 comprises: a bottomed tubular housing 12 whose one side is closed; a rotor 14 housed in the housing 12; and an assembly case 16 installed in an opening of the housing 12. The housing 12 is a metal member, and a field magnet 18 is fixed to the inner circumferential surface of the housing 12.

A commutator 22 is provided in part of a shaft 20 of the rotor 14, the shaft 20 serving as a rotating shaft. The assembly case 16 includes a brush holder having a pair of carbon brushes that are arranged to face the commutator 22. The brush holder has a movement restricting structure configured to restrict a movement of a brush.

Figure 2A:
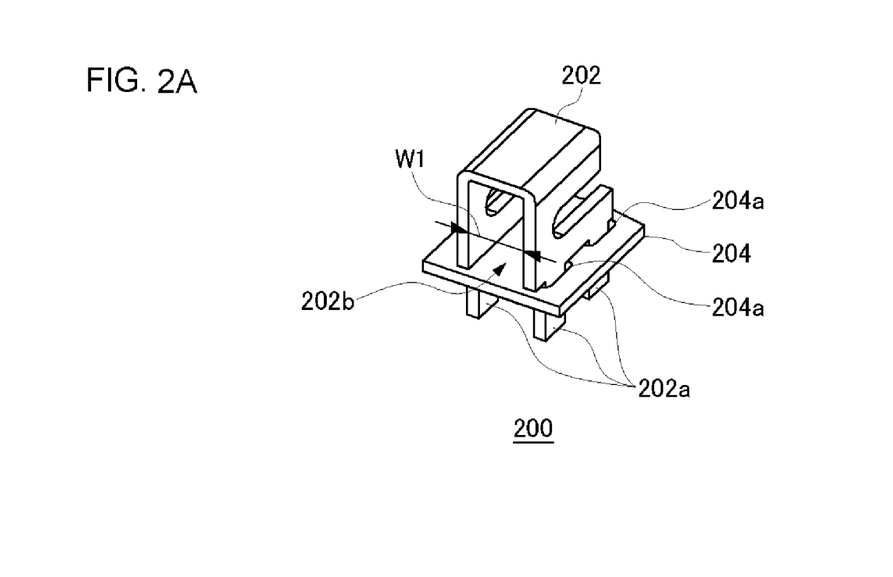
FIG. 2A is a perspective view of a carbon holder structure excluding a movement restricting structure according to a reference example.
Figure 2B:
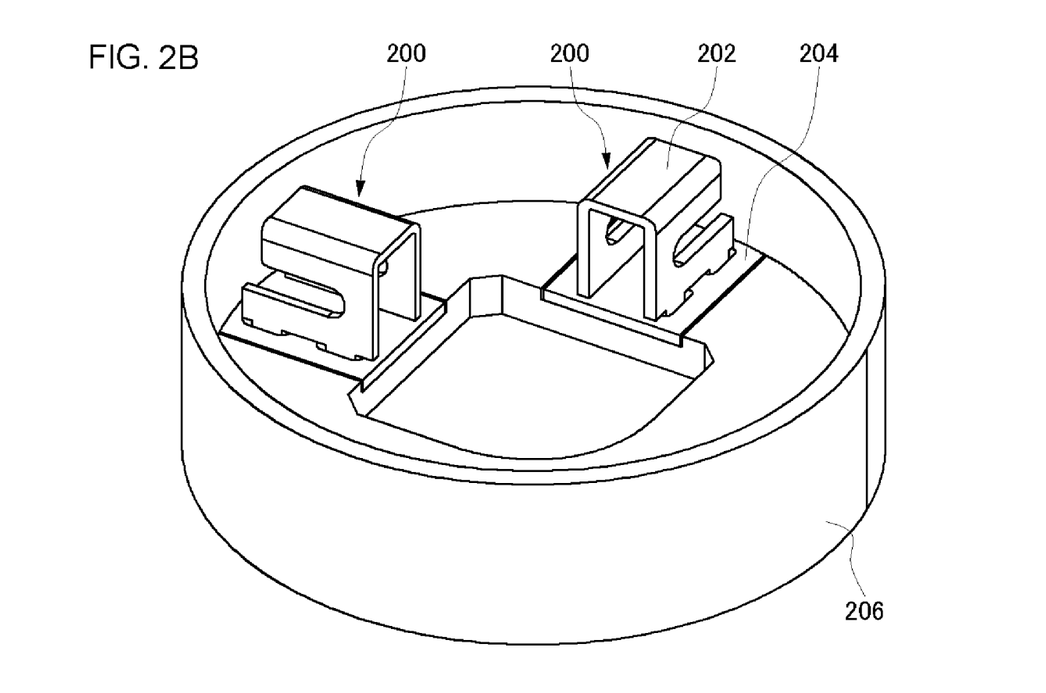
FIG. 2B is a perspective view of a brush holder excluding the movement restricting structure according to the reference example.

FIG. 2A is a perspective view of a carbon holder structure 200 excluding a movement restricting structure according to a reference example, and FIG. 2B is a perspective view of a brush holder excluding the movement restricting structure according to the reference example. The carbon holder structure 200 illustrated in FIG. 2A has a carbon holder 202 for slidably housing a brush and a base plate 204 on which the carbon holder 202 is mounted. The carbon holder 202 houses the brush in an arched space. A plurality of legs 202a are provided in the carbon holder 202, and a plurality of through holes 204a are formed in the base plate 204.

The carbon holder 202 is positioned with respect to the base plate 204 with each leg 202a being inserted into a corresponding through hole 204a in the base plate 204. The carbon holder structure 200 thus configured is mounted at a predetermined position of the brush holder 206 via the base plate 204.

In the carbon holder structure 200, the looseness degree of the brush is determined by the accuracy of a width W1 of an opening 202b on the tip side of the carbon holder 202. That is, when it is assumed that the width tolerance of the brush itself is constant, the looseness of the brush can be suppressed if the tolerance of the width W1 of the opening 202b can be made small. As illustrated in FIG. 2A, however, when the opening 202b of the carbon holder 202 is formed by bending a plate-shaped member, there is a limit on the dimensional accuracy thereof. In particular, in the carbon holder 202 in which a portion for guiding a movement of the brush and a portion for suppressing the looseness of the brush, the looseness occurring in the commutator circumferential direction, are commonly used, it is difficult to suppress the looseness of the brush any more.

In such a case, a situation is caused, in which the position at which the brush contacts the commutator is shifted to the lagging angle because of the looseness of the brush. As a result, the performance of the motor, such as the torque or the maximum rotating speed of the motor, is decreased, and further wear of the brush is accelerated because sparks are generated between the brush and the commutator, which may cause the life of the brush, and eventually, the life of the motor to be shortened. Simultaneously, an increase in the noise during the drive of a motor or a turbulence in the current waveform may be caused.

Figure 3:
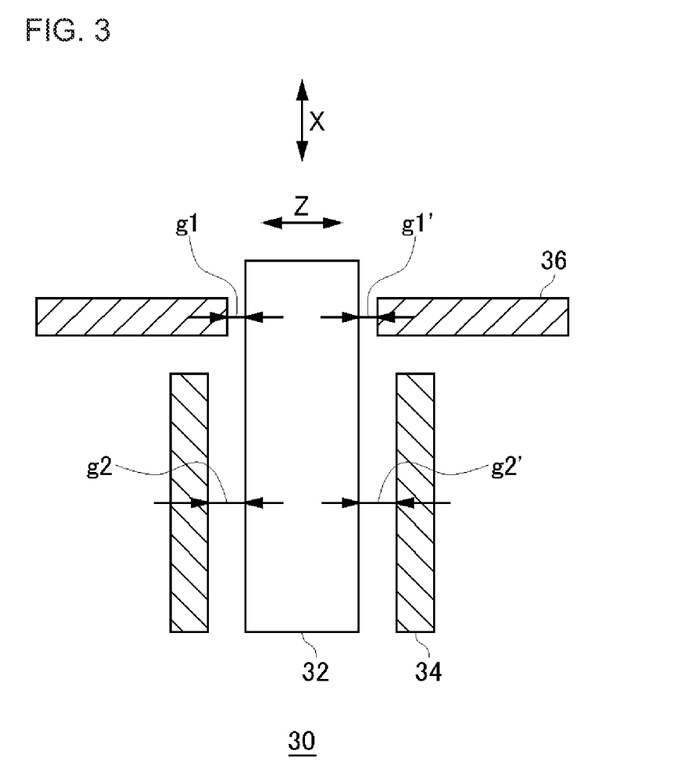
FIG. 3 is a view schematically illustrating the outline of a movement restricting structure according to First embodiment.

So, as a result of intensive study, the present inventors have found that various devices can be made by functionally separating the portion for guiding a movement of the brush and the portion for suppressing the looseness of the brush, the looseness occurring in the commutator circumferential direction, from each other. FIG. 3 is a view schematically illustrating the outline of a movement restricting structure according to First embodiment.

As illustrated in FIG. 3, a movement restricting structure 30 according to First Embodiment includes: a carbon holder 34 that serves as a holder for housing a brush 32 while permitting a movement of the brush 32 in a commutator radial direction X; and a circumferentially restricting part 36 for restricting a movement of the brush 32 in a commutator circumferential direction Z. A clearance (g1+g1') between the circumferentially restricting part 36 and the brush 32, extending in the commutator circumferential direction, is formed to be smaller than that (g2+g2') between the carbon holder 34 and the brush 32, extending in the commutator circumferential direction.

Thus, it is not necessary to make the clearance between the carbon holder 34 and the brush 32, extending in the commutator circumferential direction, to be smaller than that between the circumferentially restricting part 36 and the brush 32, extending in the commutator circumferential direction, and hence the working accuracy of the carbon holder 34 does not need to be increased so much.

Figure 4A:
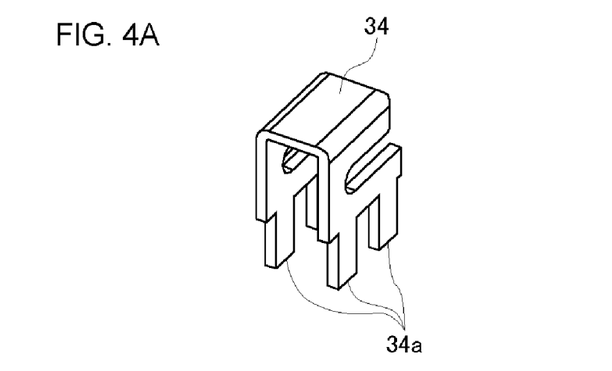
FIG. 4A is a perspective view of a carbon holder according to First Embodiment.
Figure 4B:
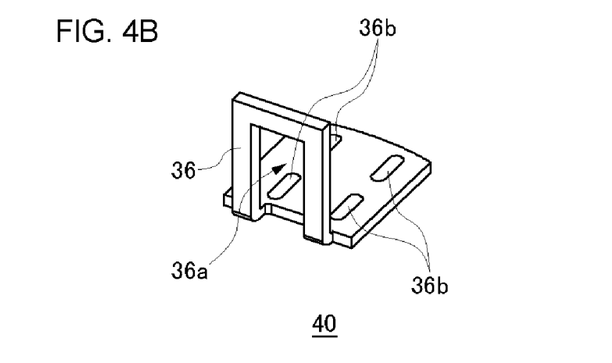
FIG. 4B is a perspective view of a base plate including a circumferentially restricting part according to First Embodiment.
Figure 4C:
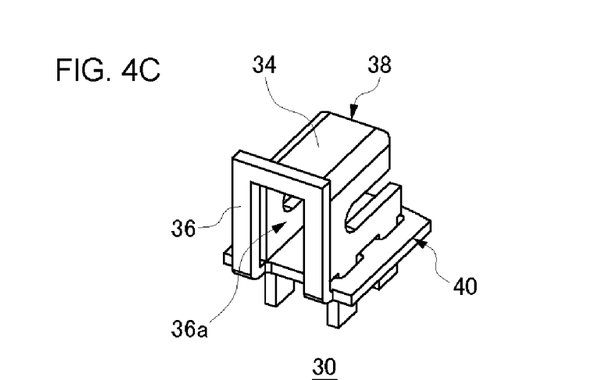
FIG. 4C is a perspective view of the movement restricting structure according to First Embodiment.
Figure 5:
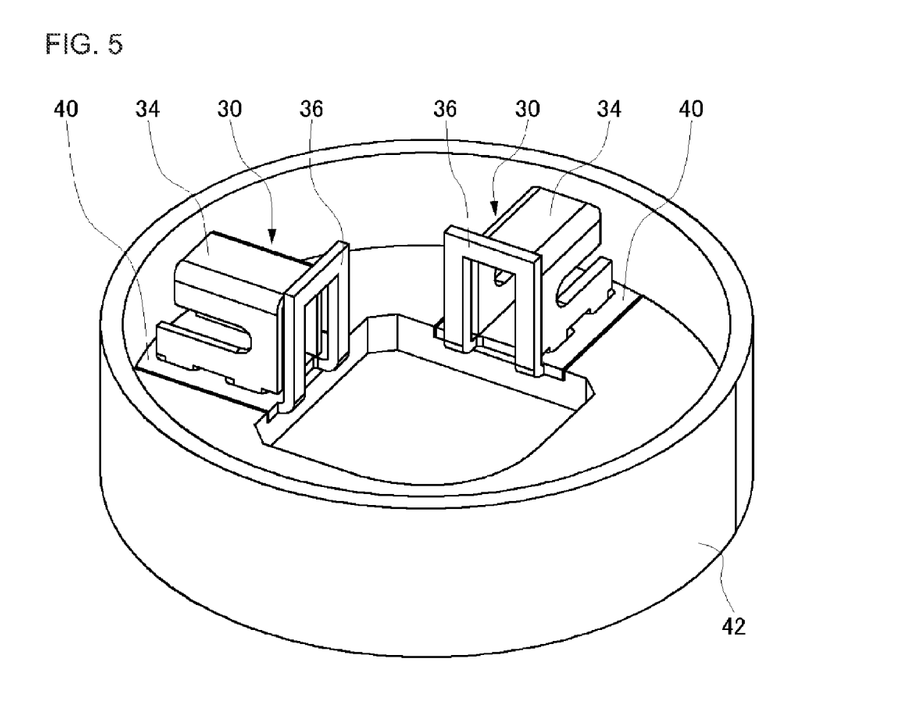
FIG. 5 is a perspective view of a brush holder including the movement restricting structure according to First Embodiment.

FIG. 4A is a perspective view of the carbon holder according to First Embodiment, FIG. 4B is a perspective view of a base plate including the circumferentially restricting part according to First Embodiment, and FIG. 4C is a perspective view of the movement restricting structure according to First Embodiment. FIG. 5 is a perspective view of the brush holder including the movement restricting structure according to First Embodiment. Hereinafter, description of the same configurations as in the reference example will be appropriately omitted.

The carbon holder 34 according to First Embodiment is made by pressing a metal plate into a predetermined shape and then by bending it into an arched (tubular) shape, as illustrated in FIG. 4A. Additionally, a plurality of legs 34a also formed in the carbon holder 34. A base plate 40 according to First Embodiment is made by pressing a metal plate into a predetermined shape and then by bending part of it, as illustrated in FIG. 4B. The circumferentially restricting part 36, or a gate-shaped portion that has been bent, has a passing port 36a through which a brush passes. That is, this passing port 36a is formed by punching.

The carbon holder 34 is positioned with respect to the base plate 40 with each leg 34a being inserted into a corresponding through hole 36b in the base plate 40. That is, the base plate 40 has a positioning part by which the carbon holder 34 is positioned. The movement restricting structure 30 thus configured is mounted at a predetermined position of the brush holder 42 via the base plate 40.

As described above, the dimensional accuracy of the circumferentially restricting part 36 is high because of the punching, and hence the looseness of the brush can be suppressed in the movement restricting structure 30. Further, with the suppression of the looseness of the brush, a decrease in the performance of the motor can be suppressed, and further the life of the motor can be extended because of a reduction in spark wear. Noise due to vibration or occurrence of electrical noise can be suppressed. Further, punching can be performed on a plurality of members at one time, in contrast to bending, which contributes to an improvement in productivity. Herein, the punching includes, for example, pressing such as punching out and piercing. The material of the circumferentially restricting part 36 is not particularly limited, as far as desired accuracy can be achieved, and examples thereof include, for example, metal plates made of brass, copper, and the like. Examples of the material of the brush include, for example, precious metals and alloys thereof in addition to carbon. An example of the shape of the brush includes a chamfered rectangular parallelepiped.

The passing port 36a in the circumferentially restricting part 36 has a shape in which the circumference of the passing port 36a is closed, as illustrated in FIG. 4B. Thereby, the stiffness of the entire member surrounding the passing port 36a becomes higher than that of the case where a slit is provided in part of the circumference of the passing port 36a, which can suppress a deformation by external force. Further, a deformation occurring at the punching is small, and hence the passing port 36a having high dimensional accuracy can be formed. Furthermore, the power, applied when the brush contacts the inner edge of the passing port 36a, is the same as the other when the motor rotates in either direction, and hence the looseness of the brush can be suppressed with a simple configuration even in either rotating direction.

When the aforementioned steps are considered as a manufacturing method of a movement restricting structure, this method is a manufacturing method of the movement restricting structure 30 including: the carbon holder 34 for housing a brush configured to contact a commutator of a motor while permitting a movement of the brush in the commutator radial direction; and the circumferentially restricting part 36 for restricting a movement of the brush in the commutator circumferential direction. This method comprises forming the carbon holder 34 by bending a metal plate, and forming the passing port 36*a* in the circumferentially restricting part 36 by punching, through which the brush passes. According to this manufacturing method, the dimensional accuracy of the circumferentially restricting part 36 can be increased because of the punching, and hence the movement restricting structure 30 can be manufactured, in which the looseness of the brush is further suppressed.

In addition, the circumferentially restricting part 36 is formed integrally with the base plate 40, and formed by being bent upward, centering around the end portion of the base plate 40 near to the commutator, i.e., around the joint portion with the base plate 40 of the circumferentially restricting part 36. Accordingly, even if the accuracy of the bending is somewhat low and the position of the circumferentially restricting part 36 having been subjected to the bending is somewhat shifted from a desired one in the commutator shaft direction, the position of the circumferentially restricting part 36 in the commutator circumferential direction is less affected. Accordingly, an effect of suppressing the looseness of the brush, having high accuracy, can be expected.

(Second Embodiment)

Figure 6A:
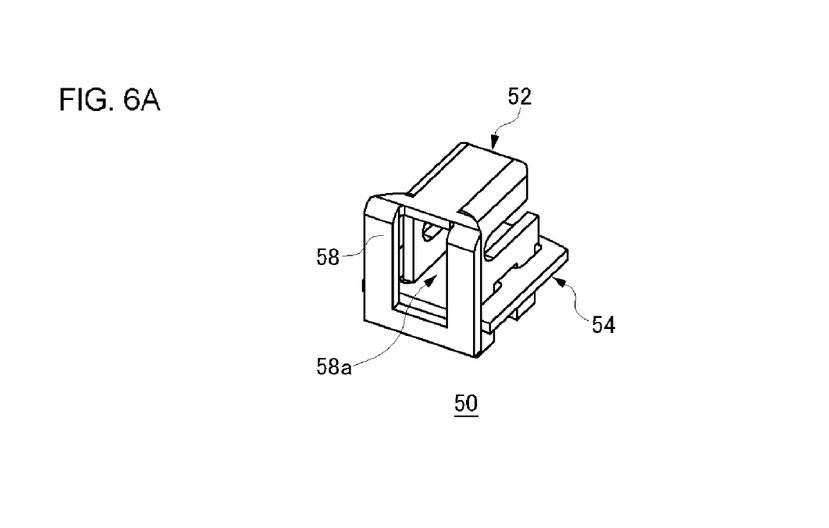
FIG. 6A is a perspective view of a movement restricting structure according to Second Embodiment.
Figure 6B:
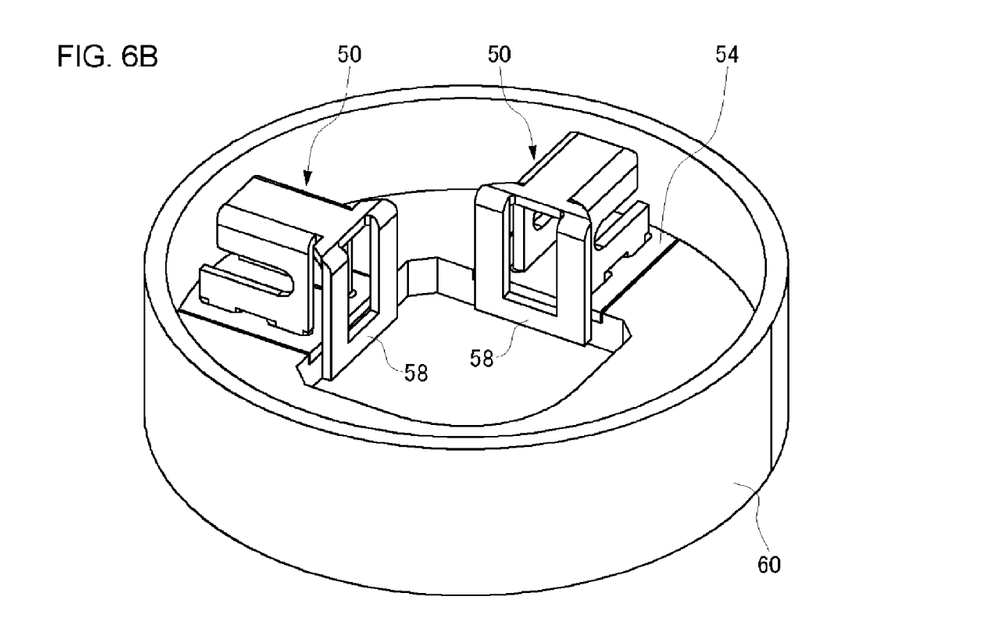
FIG. 6B is a perspective view of a brush holder including the movement restricting structure according to Second Embodiment.

FIG. 6A is a perspective view of a movement restricting structure according to Second Embodiment, and FIG. 6B is a perspective view of a brush holder including the movement restricting structure according to Second Embodiment. Hereinafter, description of the structures and the operation effects similar to those in the aforementioned embodiment will be appropriately omitted.

A movement restricting structure 50 illustrated in FIG. 6A includes a carbon holder 52 and a base plate 54. The carbon holder 52 has a gate-shaped circumferentially restricting part 58 that is formed by pressing a metal plate into a predetermined shape, then by bending it into an arched shape, and further by bending part of it. The circumferentially restricting part 58 has a passing port 58*a* through which a brush passes. That is, this passing port 58*a* is formed by punching.

The carbon holder 52 is positioned with respect to the base plate 54 with each leg being inserted into a corresponding through hole in the base plate 54. The movement restricting structure 50 thus configured is mounted at a predetermined position of a brush holder 60 via the base plate 54.

As described above, the dimensional accuracy of the circumferentially restricting part 58 is high because of the punching, and hence the looseness of the brush can be suppressed in the movement restricting structure 50. Thereby, a decrease in the performance of the motor can be suppressed, and further the life of the motor can be extended because of a reduction in spark wear. Furthermore, noise due to vibration or occurrence of electrical noise can be suppressed. Furthermore, punching can be performed on a plurality of members at one time, in contrast to bending, which contributes to an improvement in productivity. Furthermore, in the bending of the circumferentially restricting part 58, the circumferentially restricting part 58 is bent downward, centering around the joint portion between the circumferentially restricting part 58 and the carbon holder 52, and hence an effect of suppressing the looseness of the brush, having high accuracy, can be expected, even if the accuracy of the bending is somewhat low, similarly to the effect in First Embodiment. The circumferentially restricting part 58 is formed integrally with the carbon holder 52. Thereby, the number of parts can be reduced, and it is not necessary to take into consideration positional accuracy by assembling.

(Third Embodiment)

Figure 7A:
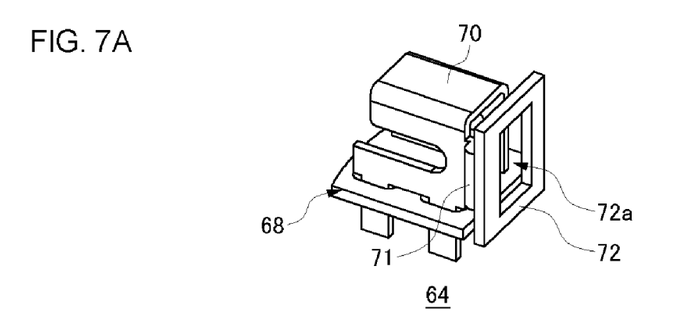
FIG. 7A is a perspective view of a movement restricting structure according to Third Embodiment.
Figure 7B:
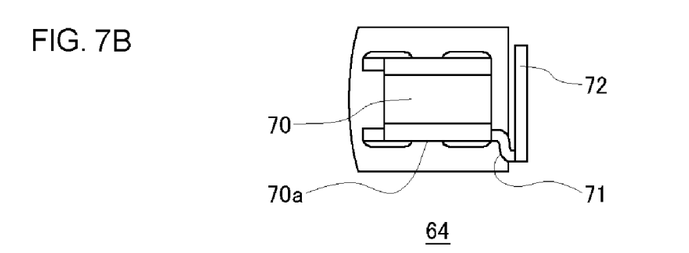
FIG. 7B is a top view of the movement restricting structure according to Third Embodiment.
Figure 7C:
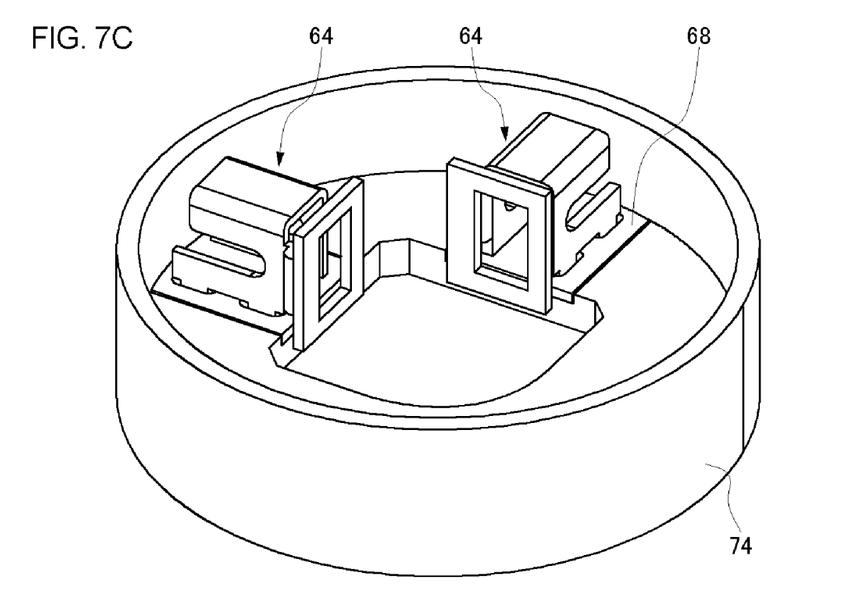
FIG. 7C is a perspective view of a brush holder including the movement restricting structure according to Third Embodiment.

FIG. 7A is a perspective view of a movement restricting structure according to Third Embodiment, FIG. 7B is a top view of the movement restricting structure according to Third Embodiment, and FIG. 7C is a perspective view of a brush holder including the movement restricting structure according to Third Embodiment. The movement restricting structure according to the present embodiment is greatly different from that according to Second Embodiment in that the side wall of a carbon holder and a circumferentially restricting part are connected together via a bent portion. Hereinafter, description of the structures and the operation effects similar to those in the aforementioned embodiments will be appropriately omitted.

A movement restricting structure 64 illustrated in FIG. 7A includes a carbon holder 70 and a base plate 68. The movement restricting structure 64 includes: the carbon holder 70 that is made by pressing a metal plate into a predetermined shape and then by bending it into an arched shape; and a circumferentially restricting part 72 having a quadrangular shape that is connected to a side wall 70*a* of the carbon holder 70 via a bent portion 71, as illustrated in FIG. 7A. The circumferentially restricting part 72 has a quadrangular passing port 72*a* through which a brush passes. This passing port 72*a* is formed by punching.

The carbon holder 70 is positioned with respect to the base plate 68 with each leg being inserted into a corresponding through hole in the base plate 68. The movement restricting structure 64 thus configured is mounted at a predetermined position of a brush holder 74 via the base plate 68.

As described above, the dimensional accuracy of the circumferentially restricting part 72 is high because of the punching, and hence the looseness of the brush can be suppressed in the movement restricting structure 64. Further, a decrease in the performance of the motor can be suppressed, and additionally the life of the motor can be extended because of a reduction in spark wear. Furthermore, noise due to vibration or occurrence of electrical noise can be suppressed. Furthermore, because the circumferentially restricting part 72 has the quadrangular passing port 72*a* through which a brush passes, and hence the looseness of the brush in various directions can be accurately suppressed.

The circumferentially restricting part 72 is formed by being bent in the commutator circumferential direction, centering around the bent portion 71. Accordingly, the circumferential strength of the circumferentially restricting part 72 becomes stronger than that of the case where the circumferentially restricting part 72 is formed by being bent in the commutator shaft direction, and hence there is an effect of suppressing a vibration or noise of the circumferentially restricting part 72 that may be associated with the looseness of the brush.

(Fourth Embodiment)

Figure 8A:
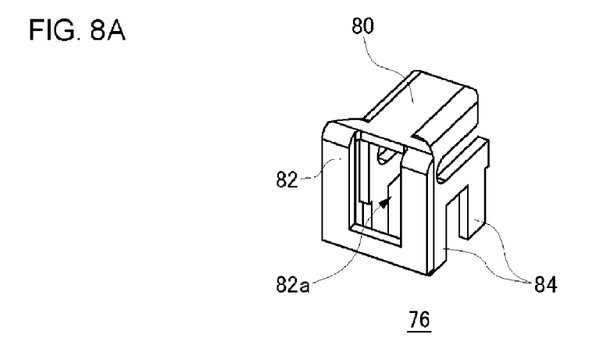
FIG. 8A is a perspective view of a movement restricting structure according to Fourth Embodiment.
Figure 8B:
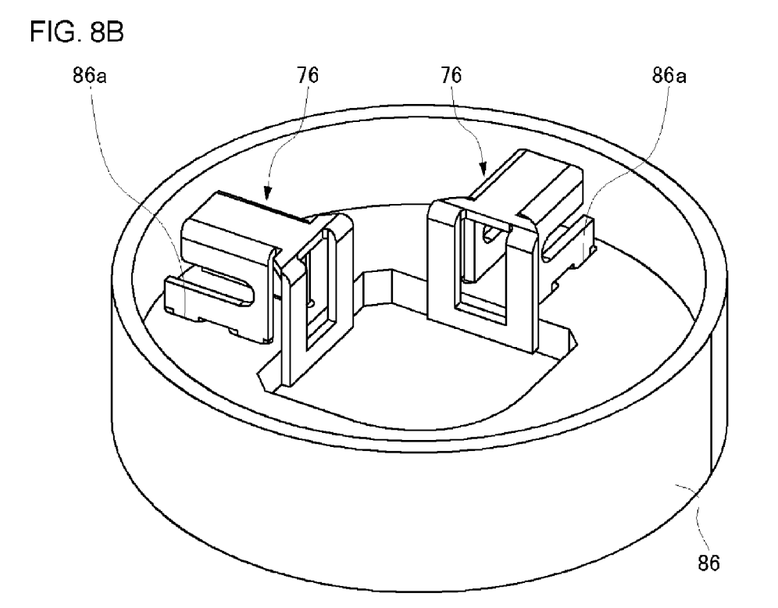
FIG. 8B is a perspective view of a brush holder including the movement restricting structure according to Fourth Embodiment.

FIG. 8A is a perspective view of a movement restricting structure according to Fourth Embodiment, and FIG. 8B is a perspective view of a brush holder including the movement restricting structure according to Fourth Embodiment. The movement restricting structure according to the present embodiment is greatly different from that according to Second Embodiment in that the movement restricting structure is directly mounted in a brush holder, not via a base plate. Hereinafter, description of the structures and the operation effects similar to those in the aforementioned embodiments will be appropriately omitted.

A movement restricting structure 76 illustrated in FIG. 8A is made of one member of a carbon holder 80. The carbon holder 80 has: a gate-shaped circumferentially restricting part 82 that is formed by pressing a metal plate into a predetermined shape, then by bending it into an arched shape with bending processing, and further by bending part of it; and a plurality of legs 84. The circumferentially restricting part 82 has a passing port 82a through which a brush passes. That is, this passing port 82a is formed by punching.

The carbon holder 80 is positioned with respect to the brush holder 86 with each leg 84 being inserted into a hole 86a formed in the brush holder 86.

(Fifth Embodiment)

Figure 9A:
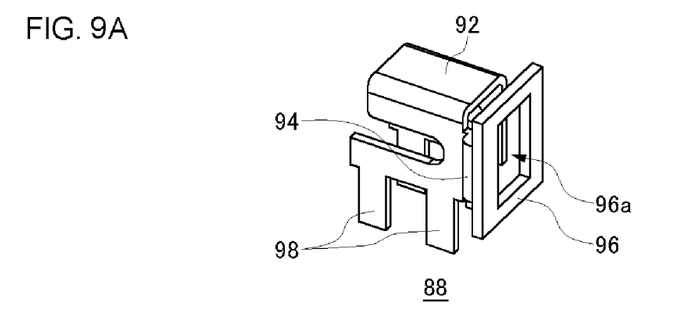
FIG. 9A is a perspective view of a movement restricting structure according to Fifth Embodiment.
Figure 9B:
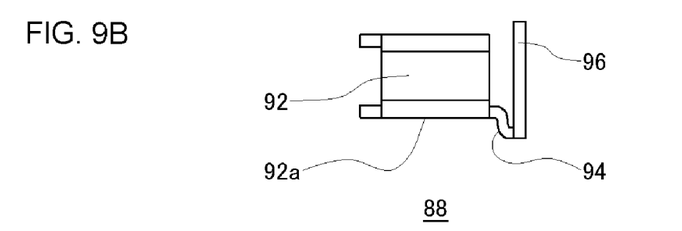
FIG. 9B is a top view of the movement restricting structure according to Fifth Embodiment.
Figure 9C:
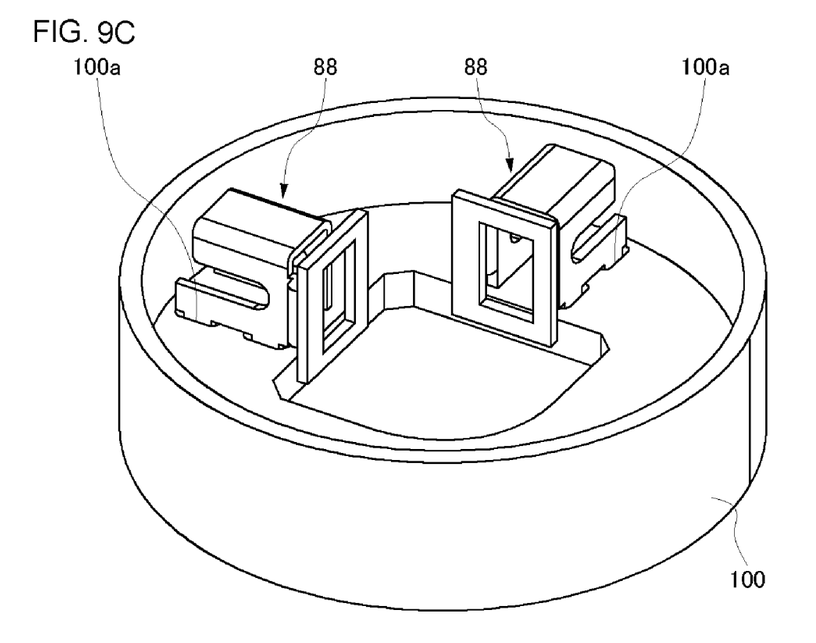
FIG. 9C is a perspective view of a brush holder including the movement restricting structure according to Fifth Embodiment.

FIG. 9A is a perspective view of a movement restricting structure according to Fifth Embodiment, FIG. 9B is a top view of the movement restricting structure according to Fifth Embodiment, and FIG. 9C is a perspective view of a brush holder including the movement restricting structure according to Fifth Embodiment. The movement restricting structure according to the present embodiment is greatly different from that according to Third Embodiment in that the movement restricting structure is directly mounted in the brush holder, not via a base plate. Hereinafter, description of the structures and the operation effects similar to those in the aforementioned embodiments will be appropriately omitted.

A movement restricting structure 88 illustrated in FIG. 9A is made of one member of a carbon holder 92. The carbon holder 92 has a circumferentially restricting part 96 having a quadrangular shape that is made by pressing a metal plate into a predetermined shape and then by bending it into an arched shape, and that is connected to part of a side wall 92a of the carbon holder 92 via a bent portion 94, as illustrated in FIG. 9A. The circumferentially restricting part 96 has a quadrangular passing port 96a through which a brush passes. This passing port 96a is formed by punching.

The carbon holder 92 is positioned with respect to the brush holder 100 with each leg 98 being inserted into a hole 100a formed in the brush holder 100.

(Sixth Embodiment)

Figure 10A:
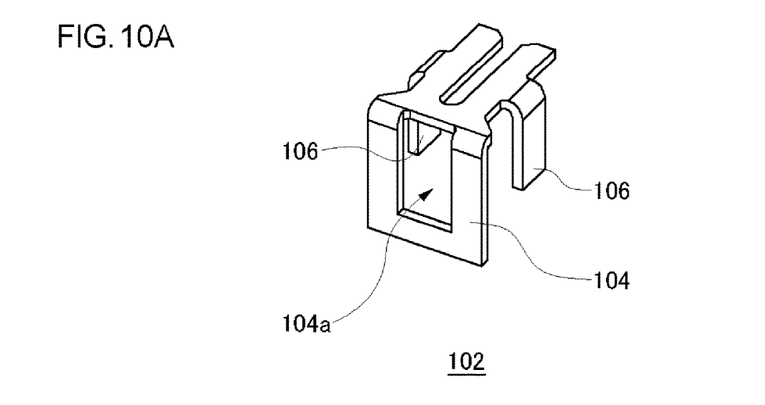
FIG. 10A is a perspective view of a carbon holder according to Sixth Embodiment.
Figure 10B:
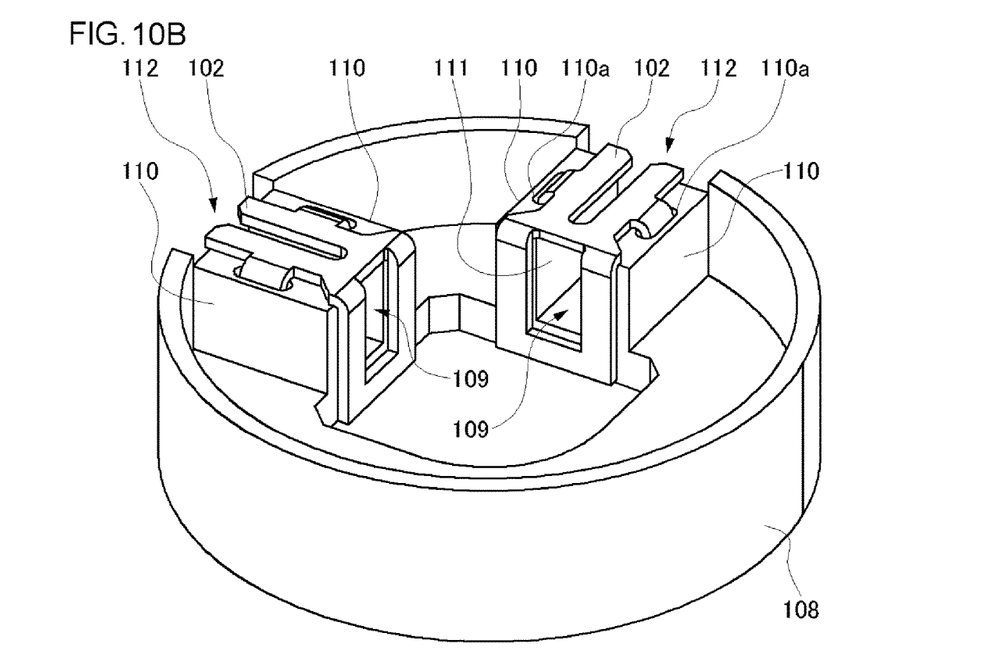
FIG. 10B is a perspective view of a brush holder including a movement restricting structure according to Sixth Embodiment.

FIG. 10A is a perspective view of the carbon holder according to Sixth Embodiment, and FIG. 10B is a perspective view of a brush holder including a movement restricting structure according to Sixth Embodiment. The movement restricting structure according to the present embodiment has one characteristic that it is formed by part of the brush holder and a carbon holder. Hereinafter, description of the structures and the operation effects similar to those in the aforementioned embodiments will be appropriately omitted.

The carbon holder 102 has: a gate-shaped circumferentially restricting part 104 that is formed by pressing a metal plate into a predetermined shape and then by bending it; and a plurality of legs 106, as illustrated in FIG. 10A. The circumferentially restricting part 104 has a passing port 104a through which a brush passes.

On the other hand, two pairs of two side walls 110 that form groove portions 109 are formed in a brush holder 108 illustrated in FIG. 10B. A hole 110a, into which each leg 106 of the carbon holder 102 is inserted, is formed in the upper surface of each side wall 110. The carbon holder 102 is positioned with respect to the brush holder 108 with each leg 106 being inserted into the hole 110a formed in the side wall 110, so that the upper portions of the groove portions 109 are covered.

As a result of that, a movement restricting structure 112 according to Sixth Embodiment is formed by the carbon holder 102 and the groove portion 109, and has: a housing part 111 for slidably housing a brush; and the circumferentially restricting part 104. In Sixth Embodiment, the carbon holder 102, the groove portion 109, and the housing part 111 function as a holder.

(Seventh Embodiment)

Figure 11A:
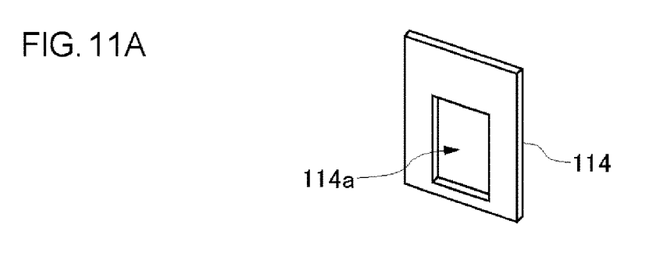
FIG. 11A is a perspective view of a circumferentially restricting part according to Seventh Embodiment.
Figure 11B:
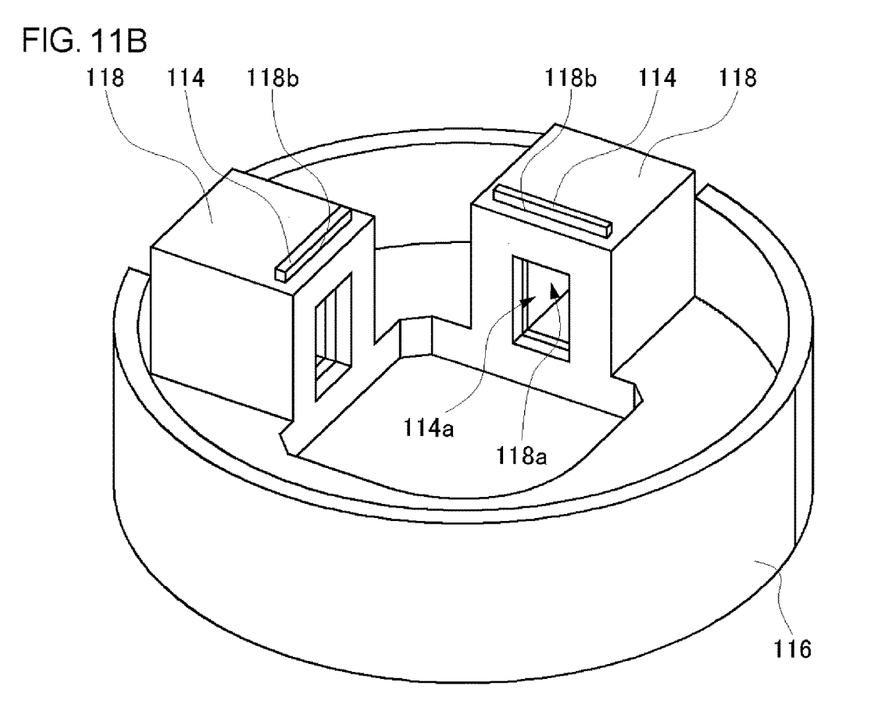
FIG. 11B is a perspective view of a brush holder including a movement restricting structure according to Seventh Embodiment.

FIG. 11A is a perspective view of a circumferentially restricting part according to Seventh Embodiment, and FIG. 11B is a perspective view of a brush holder including a movement restricting structure according to Seventh Embodiment. The movement restricting structure according to the present embodiment has one characteristic that the brush holder forms a housing part. Hereinafter, description of the structures and the operation effects similar to those in the aforementioned embodiment will be appropriately omitted.

A circumferentially restricting part 114 is made by punching out a central portion of a quadrangular metal plate, as illustrated in FIG. 11A. The circumferentially restricting part 114 has a quadrangular passing port 114a through which a brush passes.

On the other hand, in a brush holder 116 illustrated in FIG. 11B, two housing parts 118 are formed in advance. A slit 118b, which serves as an insertion hole through which the circumferentially restricting part 114 is inserted, is formed in the housing part 118 such that the passing port 114a is positioned in an internal space 118a in which the brush moves. Thereby, a displacement of the circumferentially restricting part 114 itself can be suppressed, and hence the looseness of the brush can be further suppressed.

The present invention has been described above with reference to the aforementioned embodiments, but the invention is not limited to the embodiments, and variations in which each component of the embodiments is appropriately combined or substituted are also encompassed by the invention. In addition, appropriate changes of the combinations or the orders of the processes in the aforementioned embodiments can be made and various modifications, such as design modifications, can be made with respect to the aforementioned embodiments, based on the knowledge of those skilled in the art, and embodiments in which such modifications are made can also be encompassed by the present invention.

What is claimed is:

1. A motor comprising:
   a brush configured to contact a commutator; and
   a movement restricting structure configured to restrict a movement of the brush, wherein
   the movement restricting structure includes:
   a holder for housing the brush while permitting a movement of the brush in a commutator radial direction; and
   a circumferentially restricting part made from a metal plate for restricting a movement of the brush in a commutator circumferential direction, the circumferentially restricting part comprised of a base plate and a circumferentially restricting portion extending from the base plate at an approximately right angle, and wherein
   a clearance between the circumferentially restricting part and the brush, extending in the commutator circumferential direction, is formed to be smaller than that between the holder and the brush, extending in the commutator circumferential direction,
   the circumferentially restricting part has a passing port, through which the brush passes,
   the base plate includes a plurality of inserting holes, the holder includes a plurality of inserting portions, each inserting portion corresponding to one of the plurality of inserting holes, so that when each of the plurality of inserting portions is inserted into its corresponding one of the plurality of inserting holes the holder is retained in the base plate such that the passing port is positioned in an internal space in which a brush moves, and the circumferentially restricting part is provided more toward the commutator than the holder.

2. The motor according to claim 1, wherein the passing port has a shape in which a circumference of the passing port is closed.

3. The motor according to claim 1, wherein the holder is a tubular member, and wherein the circumferentially restricting part is a member having a positioning part by which the holder is positioned.

4. The motor according to claim 1, wherein the holder and the circumferentially restricting part are formed by a single member.

5. The motor according to claim 4 including a bent portion by which the holder and the circumferentially restricting part are connected together.

6. The motor according to claim 5, wherein the bent portion is connected to a side wall of the holder.

7. The motor according to claim 1, wherein the width of the brush is constant.

8. A motor, comprising:
a brush configured to contact a commutator; and
a movement restricting structure configured to restrict a movement of the brush, wherein
the movement restricting structure includes:
a holder for housing the brush while permitting a movement of the brush in a commutator radial direction; and
a circumferentially restricting part for restricting a movement of the brush in a commutator circumferential direction, and wherein
the circumferentially restricting part has a passing port through which the brush passes, wherein
a clearance between the circumferentially restricting part and the brush, extending in the commutator circumferential direction, is formed to be smaller than that between the holder and the brush, extending in the commutator circumferential direction,
the circumferentially restricting part is provided more toward the commutator than the holder,
the circumferentially restricting part is a plate-shaped member in which the passing port is formed, and wherein
an insertion hole, into which the circumferentially restricting part is inserted, is formed in the holder such that the passing port is positioned in an internal space in which a brush moves.

9. A motor comprising:
a brush configured to contact a commutator; and
a movement restricting structure configured to restrict a movement of the brush, wherein the movement restricting structure is directly fixed to a brush-holder, wherein
the movement restricting structure includes:
a holder for housing the brush while permitting a movement of the brush in a commutator radial direction; and
a circumferentially restricting part made from a metal plate for restricting a movement of the brush in a commutator circumferential direction, the circumferentially restricting part comprised of a base plate and a circumferentially restricting portion extending from the base plate at an approximately right angle, and
wherein the circumferentially restricting part has a passing port, through which the brush passes,
a clearance between the circumferentially restricting part and the brush, extending in the commutator circumferential direction, is formed to be smaller than that between the holder and the brush, extending in the commutator circumferential direction,
the base plate includes a plurality of inserting holes,
the holder includes a plurality of inserting portions, each inserting portion corresponding to one of the plurality of inserting holes, so that when each of the plurality of inserting portions is inserted into its corresponding one of the plurality of inserting holes the holder is retained in the base plate such that the passing port is positioned in an internal space in which a brush moves, and
the circumferentially restricting part is provided more toward the commutator than the holder.

* * * * *